United States Patent
Cellier et al.

(10) Patent No.: US 9,464,526 B2
(45) Date of Patent: Oct. 11, 2016

(54) AIRFOIL AND PLATFORM ASSEMBLY FOR SUBSONIC FLOW

(75) Inventors: Damien Cellier, Paris (FR); Vincent Paul Gabriel Perrot, Maisons Alfort (FR); Jean-Francois Rios, Nandy (FR)

(73) Assignee: SNECMA, Paris (FR)

( * ) Notice: Subject to any disclaimer, the term of this patent is extended or adjusted under 35 U.S.C. 154(b) by 486 days.

(21) Appl. No.: 13/984,769

(22) PCT Filed: Feb. 6, 2012

(86) PCT No.: PCT/FR2012/050253
§ 371 (c)(1),
(2), (4) Date: Aug. 9, 2013

(87) PCT Pub. No.: WO2012/107676
PCT Pub. Date: Aug. 16, 2012

(65) Prior Publication Data
US 2013/0315739 A1    Nov. 28, 2013

(30) Foreign Application Priority Data
Feb. 10, 2011    (FR) .................................. 11 51069

(51) Int. Cl.
*F01D 25/24*    (2006.01)
*F01D 5/02*    (2006.01)
(Continued)

(52) U.S. Cl.
CPC ................. *F01D 5/02* (2013.01); *F01D 5/143* (2013.01); *F01D 5/145* (2013.01); *F04D 29/329* (2013.01);
(Continued)

(58) Field of Classification Search
CPC ........ F01D 5/02; F01D 5/143; F04D 29/329; F04D 29/522; F05D 2240/80; F05D 2250/711; F05D 2250/713; F05D 2240/301; Y02T 50/673
USPC ..................................................... 416/193 A
See application file for complete search history.

(56) References Cited

U.S. PATENT DOCUMENTS

| 5,397,215 A | 3/1995 | Spear et al. |
| 2007/0258817 A1 | 11/2007 | Allen-Bradley et al. |

(Continued)

FOREIGN PATENT DOCUMENTS

| CN | 1847623 A | 10/2006 |
| CN | 101213353 A | 7/2008 |

(Continued)

OTHER PUBLICATIONS

Office Action issued Nov. 17, 2015 in Japanese Patent Application No. 2013-553009 (with English language translation).
(Continued)

*Primary Examiner* — Zelalem Eshete
(74) *Attorney, Agent, or Firm* — Oblon, McClelland, Maier & Neustadt, L.L.P.

(57) ABSTRACT

An assembly including an airfoil for a bladed wheel together with a platform, the airfoils in association with such platforms forming a bladed wheel. The platform surface presents a circumferential depression between a leading edge of an airfoil at 60% of the airfoil going downstream. A skeleton curve designates a curve plotting variations in a skeleton angle of the airfoil as a function of position along the axis of the wheel; and a linearized skeleton curve designates a curve that provides a straight line connection between points representing the skeleton angle respectively at 10% and at 90% of an axial extent of the airfoil from its leading edge, and, in a vicinity of the platform, a lowered portion of the skeleton curve lying under the linearized skeleton curve extends axially over at least half of an axial extent of the depression.

14 Claims, 4 Drawing Sheets

(51) Int. Cl.
  *F01D 5/14* (2006.01)
  *F04D 29/32* (2006.01)
  *F04D 29/52* (2006.01)
(52) U.S. Cl.
  CPC ....... *F04D 29/522* (2013.01); *F05D 2240/301* (2013.01); *F05D 2240/80* (2013.01); *F05D 2250/711* (2013.01); *F05D 2250/713* (2013.01); *Y02T 50/673* (2013.01)

(56) References Cited

U.S. PATENT DOCUMENTS

| | | |
|---|---|---|
| 2008/0118362 A1 | 5/2008 | Hu et al. |
| 2010/0143139 A1 | 6/2010 | Pandey et al. |
| 2010/0158696 A1 | 6/2010 | Pandey et al. |
| 2011/0189023 A1 | 8/2011 | Guimbard et al. |

FOREIGN PATENT DOCUMENTS

| | | |
|---|---|---|
| CN | 101960093 A | 1/2011 |
| CN | 101960095 A | 1/2011 |
| FR | 2 928 174 | 9/2009 |
| GB | 944 166 | 12/1963 |
| JP | 6-257597 A | 9/1994 |
| JP | 2007-177736 A | 7/2007 |
| WO | 96 00841 | 1/1996 |

OTHER PUBLICATIONS

Combined Chinese Office Action and Search Report issued Sep. 28, 2014 in Patent Application No. 201280008318.3 (with partial English translation and English translation of categories of cited documents).
U.S. Appl. No. 13/984,722, filed Aug. 9, 2013, Cellier, et al.
International Search Report Issued Jun. 8, 2012 in PCT/FR12/50253 Filed Feb. 6, 2012.

AIRFOIL AND PLATFORM ASSEMBLY FOR SUBSONIC FLOW

The invention relates to an assembly comprising an airfoil for a turbine engine bladed wheel together with a platform on which the airfoil is to be mounted, the assembly as formed in this way being arranged in such a manner that a plurality of airfoils fastened on the platform or on a plurality of assembled-together platforms can form a bladed wheel. The term "platform" is used herein to designate a part that defines the radially inner side of an interblade passage formed between two adjacent airfoils of a bladed wheel. The term "platform surface" is used to designate the platform surface that faces the interblade passage. The platform surface may also designate the assembly of the platform surfaces of a bladed wheel considered collectively.

In known manner, the airfoils of a bladed wheel may be made integrally with the rotor disk in order to constitute a bladed wheel. The part made in this way that combines both airfoils and their platforms is referred to as a one-piece bladed wheel. In another embodiment, the airfoils are made independently from the rotor disk (i.e. they constitute distinct parts). Under such circumstances, the airfoils are formed with respective roots enabling them to be fastened to the rotor disk, thereby constituting blades. The assembly comprising blades on the rotor disk thus constitutes a bladed wheel.

The invention seeks an advantageous arrangement of an airfoil relative to the platform surface; such an arrangement may be provided in the various constructions described above, independently of whether the platform and the airfoil do or do not constitute distinct parts.

The invention seeks more particularly to make assemblies as described above for making bladed wheels of (high pressure or low pressure) compressors, and in particular of multistage compressors that are to be found in turbine engines or in helicopter turboshaft engines. The invention may also be used for making blades or bladed wheels for the turbines of turbine engines (which turbines may be high pressure or low pressure turbines).

The aerodynamic efficiency of a compressor stage (equal to the ratio of the ideal work (i.e. the work associated with an isentropic transformation) and the work generally delivered to the fluid in order to obtain a given pressure increase between the upstream and downstream ends of the compressor stage) in a turbine engine depends not only on the shape of the airfoils, but also on the shape of the platforms. In order to improve this efficiency, it is known to modify the platform surface in one or more bladed wheels so as to locally increase or decrease the flow section for the fluid stream through the bladed wheel(s). For this purpose, and in known manner, the platform is modified by arranging a circumferential depression and/or a circumferential bulging area in its surface level with the airfoils. (The term "circumferential" is used herein with respect to a depression or a bulging area to designate a depression or a bulging area that is substantially a surface of revolution, naturally with the exception of the immediate vicinity of the airfoils.) Such a modification, known as "contouring" serves to improve the aerodynamic efficiency of the bladed wheel and more generally of the compressor stage. The terms "depression" and "bulging area" should be understood with reference to a theoretical surface radially defining the inside of the passage and varying linearly from upstream to downstream of the bladed wheel.

Nevertheless, in spite of the increase in efficiency as obtained in this way for the bladed wheel, such a modification generally also gives rise to certain undesirable effects on the fluid stream. Specifically:

it may give rise to high pressure gradients at the outlet from the bladed wheel; such gradients are harmful to the operation of the bladed wheel, and in particular to the overall efficiency of the turbine engine, in particular in multistage compressors;

it may give rise to non-uniformities in speed distributions around the airfoils, in particular in the vicinity of their roots; and finally, it may lead to a modification in the compression ratio of the wheel (where the compression ratio is equal to the ratio of the pressures upstream and downstream of the bladed wheel).

When such undesirable side effects are observed, they are generally remedied by modifying the shape of the bladed wheels situated in the fluid passage downstream from the bladed wheel under consideration. Nevertheless, such modifications cannot conserve the improvement in efficiency made possible by modifying the platform surface of the bladed wheel under consideration; in addition, it is not always possible to make such modifications.

The object of the invention is to remedy such drawbacks by proposing an assembly comprising an airfoil for a turbine engine bladed wheel and a platform on which the airfoil is suitable for being mounted;

a plurality of said airfoils being suitable for being fastened to said platform or to a plurality of said platforms assembled together so as to form a bladed wheel having a wheel axis and defining upstream and downstream directions along that axis, the airfoils being arranged radially in the wheel;

in said wheel, the platform or the assembled-together platforms present a surface between the airfoils that is referred to as a platform surface and that radially defines the inside of gas-passing passages formed between the airfoils;

the platform surface presenting a circumferential depression extending axially substantially between a leading edge of an airfoil at its upstream end and up to no more than 60% of an axial extent of the airfoil at its downstream end, which assembly gives good aerodynamic efficiency to the bladed wheel, provides pressure gradients downstream from the bladed wheel similar to those that would be found in the absence of the circumferential depression in the platform surface, and makes it possible to obtain speed distributions of the fluid that are relatively uniform, in particular in the vicinity of a blade root.

In order to present the solution provided by the invention, the following elements are defined:

The "vicinity" of the platform relates to the portion of the airfoil situated at a short distance (e.g. less than 20% of the height of the airfoil) above the fillets connecting the airfoil to the platform. The skeleton angle is the angle formed by the neutral fiber of the airfoil relative to the axis of the bladed wheel in a plane perpendicular to the longitudinal direction of the airfoil, the sign of the skeleton angle being selected in such a manner that the upstream skeleton angle (the skeleton angle at the leading edge of the airfoil) is positive. The skeleton curve is the curve plotting variations in a skeleton angle of an airfoil in a section plane that is substantially parallel to the platform surface, as a function of position along the axis of the wheel. The linearized skeleton curve is the curve representing variations of an angle as a function of position along the axis of the wheel, which angle makes a straight line connection between the points representing the skeleton angle respectively at 10% and at 90% of the axial extent of the airfoil from its leading edge. The linearized skeleton angle, represented by the linearized skeleton curve, is thus equal to the skeleton angle at 10% and at 90% of the axial extent of the airfoil from the leading edge (the upstream and downstream ends of the airfoil, which may be subjected to specific arrangements, are not taken into account).

The above-specified object is achieved according to the invention by the fact that, in an assembly as specified above, in a vicinity of the platform, a lowered portion of the skeleton curve which lies under the linearized skeleton curve extends axially over at least half of the axial extent of said depression.

Thus, the invention consists in locally modifying the shape of the airfoil so as to enable the skeleton curve to be lowered (which amounts to "opening" the skeleton angle, in the sense that the skeleton angle in the section under consideration diminishes in absolute value compared with the linearized skeleton curve) in association with at least half of the circumferential depression (and thus over a range axially overlapping it), so as to adapt the airfoil to the modification of the stream that is induced by the circumferential depression provided in the platform. The alterations made to the airfoil in the vicinity of the platform enable the bladed wheel to operate optimally, taking account of the modification to the platform surface constituted by the circumferential depression.

The axial extent of the airfoil designates the distance measured at the airfoil root and along the axis of the bladed wheel between the leading edge and the trailing edge of the airfoil. The circumferential depression does not extend axially beyond 60% of the axial extent of the airfoil.

In an assembly of the invention, because of the lowered portion presented by the curve plotting variation in the skeleton angle, i.e. the "skeleton" curve, over a radially lower portion of the airfoil, the air or gas stream is deflected so as to slow down in a frame of reference relative to the blade in the vicinity of the circumferential depression. The opening of the passage provided by the circumferential depression facilitates diffusion in the vicinity of the blade root, thus making it possible, while resetting this diffusion to its value prior to arranging the circumferential depression:
  in the upstream portion of the airfoil, to limit the increase in the speed of the fluid stream, and thus reduce shockwave losses (as a result of the opening of the skeleton angle, in particular in the range extending from 0% to 40% of the axial extent of the airfoil); and
  in the downstream portion of the airfoil, to reduce the profile stream offset (the offset between the direction of the stream in the vicinity of the trailing edge and the downstream skeleton angle) by locally limiting the deflection that is imposed on the fluid.

The assembly of the invention may be subjected to the following improvements:
  the circumferential depression may extend axially substantially between the leading edge at its upstream end and only 40% of the axial extent of the airfoil at its downstream end;
  the deepest section of said depression may be situated axially in the range 15% to 35% of the axial extent of the airfoil from the leading edge of the airfoil;
  the platform surface may present a circumferential bulging area situated axially in the downstream half of the airfoil;
  a most projecting section of the bulging area may be situated axially in the range 50% to 70% of the axial extent of the airfoil from the leading edge of the airfoil;
  in said vicinity, the skeleton curve may present a raised portion lying above the linearized skeleton angle curve and situated axially downstream from said lowered portion. This raised portion may be located axially substantially level with said bulging area, and may possibly extend axially over the entire axial extent of the bulging area. The fact that the raised portion is axially substantially level with the bulging portion means that the difference between the limits of the raised portion and the bulging portion (along the axis of the bladed wheel) is less than 10%, whether upstream or downstream;
  the skeleton curve may present a slope of absolute value that is less than that of the linearized skeleton curve in the range 80% to 100%, and preferably in the range 60% to 100% of the axial extent of the airfoil from its leading edge. This arrangement makes it possible to reduce the profile stream difference at the trailing edge of the airfoil. In an embodiment, the skeleton curve may in particular be situated under the linearized skeleton curve between 10% and 90% of the axial extent of the airfoil;
  an upstream skeleton angle may be the skeleton angle at the leading edge of the airfoil; in a radially lower fourth of the airfoil, the upstream skeleton angle may increase in absolute value (the upstream angle of the airfoil is said to close) on approaching the airfoil root. This configuration of the leading edge of the airfoil contributes to reducing or eliminating the negative effects induced by the circumferential depression in the platform surface.

A second object of the invention is to provide a turbine engine blade that imparts good aerodynamic efficiency to a bladed wheel made up with the help of such blades, that provides pressure gradients downstream from the bladed wheel similar to those that would be observed in the absence of the circumferential depression in the platform surface, and that makes it possible to obtain relatively uniform speed distributions, in particular in the vicinity of the blade root.

This object is achieved by the fact that the turbine engine blade is constituted by an assembly as defined above, comprising a platform formed integrally with at least one airfoil. The platforms of such blades are generally arranged in such a manner that they define the entire interblade surface radially defining the inside of the gas flow passages that exist between the airfoils.

A third object of the invention is to provide a turbine engine bladed wheel that presents good aerodynamic efficiency, pressure gradients downstream from the bladed wheel similar to those that would be observed in the absence of a circumferential depression in the platform surface, and speed distributions that are relatively uniform, in particular in the vicinity of the blade root.

This object is achieved by the fact that the bladed wheel is made using assemblies as defined above, and in particular with blades each comprising a platform made integrally with at least one airfoil. A one-piece bladed wheel constitutes an example of such a bladed wheel.

Finally, the invention may advantageously be incorporated in a turbine engine including at least one bladed wheel as defined above.

The invention can be well understood and its advantages appear better on reading the following detailed description of embodiments given as non-limiting examples. The description refers to the accompanying drawings, in which:

FIG. 3A shows a prior art assembly and FIG. 3B shows an assembly constituting a first embodiment of the invention;

In the various figures, elements that are identical or similar are given the same references.

Figure 1:
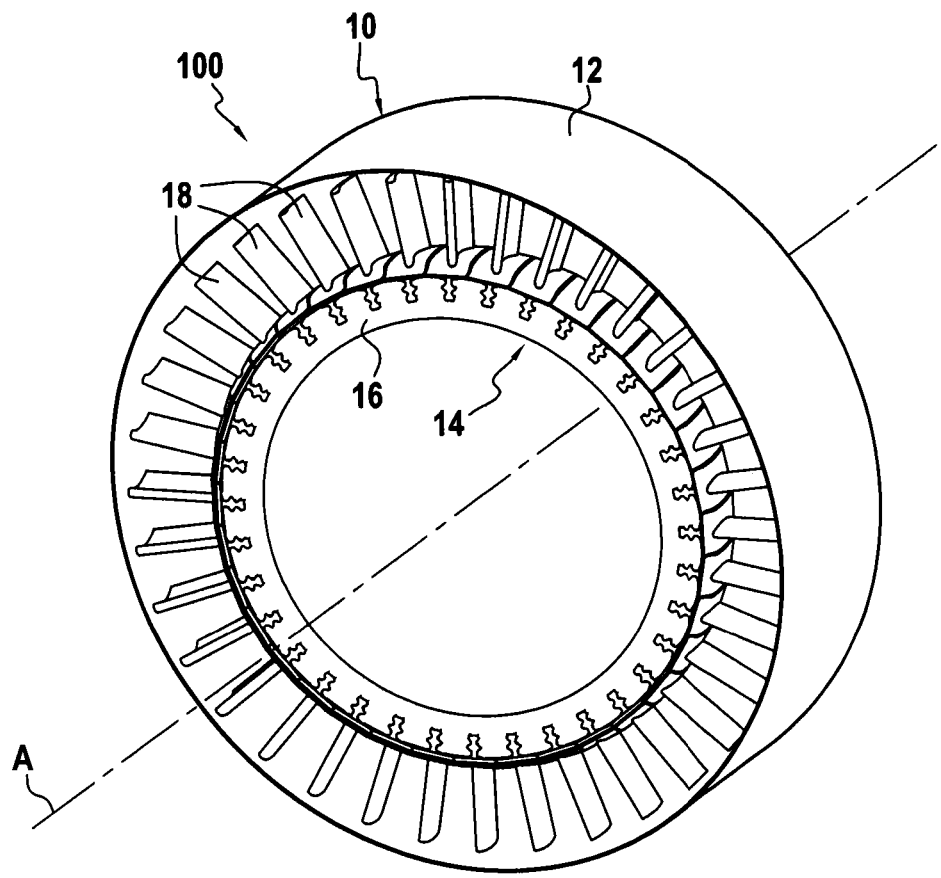
FIG. 1 is a diagrammatic perspective view of a compressor stage of a turbine engine of the invention.

FIG. 1 shows a portion of an axial-flow compressor 10 in a turbine engine 100. The compressor 10 comprises a casing 12 having a bladed wheel 14 mounted therein. The bladed wheel 14 itself comprises a rotor disk 16 having radial blades 18 fastened thereon in conventional manner in an axisymmetric configuration. The bladed wheel is arranged to be capable of turning about an axis of rotation A inside the casing 12.

Figure 2:
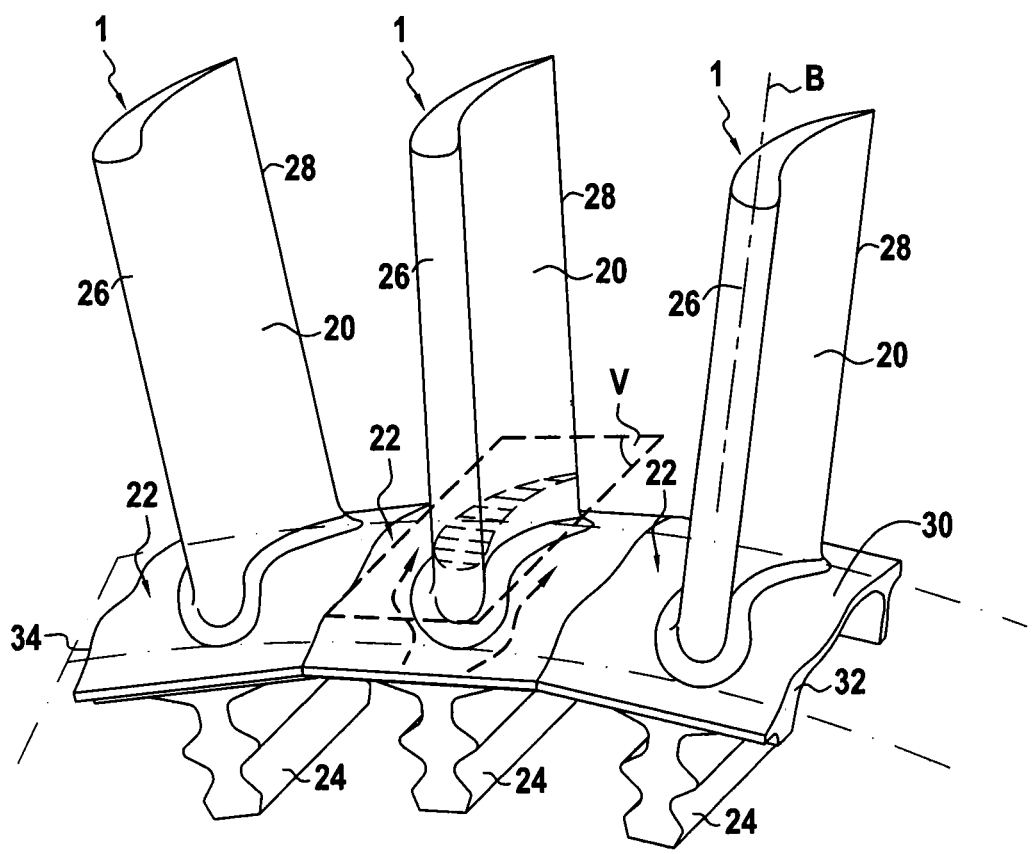
FIG. 2 is a diagrammatic perspective view of three assemblies of the invention, forming a part of the wheel shown in FIG. 1.

The arrangement of the blades 18 on the bladed wheels 14 is shown in greater detail by FIG. 2, which shows a fragment of the wheel 14.

In the wheel 14, each blade 18 forms an assembly 1 associating an airfoil 20, a platform 22, and a blade root 24. The blade platforms 22 are thus made integrally with the airfoils 20. Naturally, the invention may be implemented in other types of bladed wheel, in which the airfoils and the platform(s) constitute distinct parts.

The roots 24 serve to fasten the blades 18 to the rotor disk 16.

The platforms 22 associated within the bladed wheel 14 make up a platform surface 30 that defines the radially inner side of the inter-blade passages that allow gas to pass between the blades. This platform surface is approximately a surface of revolution—or at least it may be approximated by a surface of revolution.

The blades 18 are arranged in such a manner that when they are assembled together so as to make up the wheel 14, the platforms of the blades define the entire platform surface 30 formed between the airfoils 20. Thus, no additional portion forms a portion of or shapes the platform surface 30. In order to enable the blades 18 to be assembled together, the edges 32 on one of the sides in the circumferential direction of the bladed wheel of a platform are complementary in shape to the edges 34 of the platforms situated on the opposite sides relative to the circumferential direction C.

Each airfoil 20 has a leading edge 26 and a trailing edge 28, and it extends radially in a radial direction B that is specific to each airfoil.

In FIG. 2, there can be seen a section plane V that constitutes a section plane substantially parallel to the platform surface 30, and it is situated in the vicinity of the root of the airfoil 20.

Figure 5:
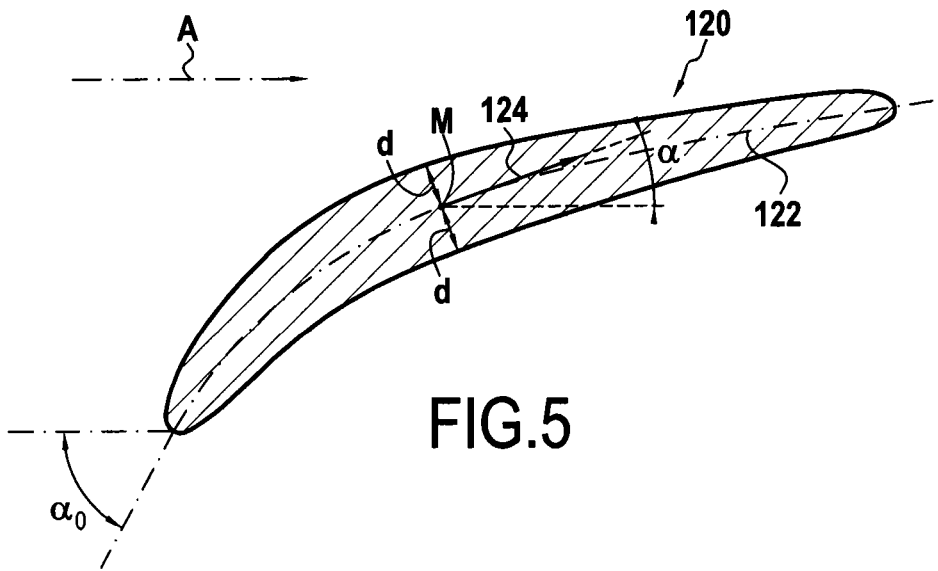
FIG. 5 is a section of an airfoil of an assembly of the invention.

FIG. 5 is a section of an airfoil 120 of a turbine engine blade in a plane perpendicular to the longitudinal axis of the airfoil.

This section shows the neutral fiber 122 of the airfoil for the plane in question. The neutral fiber is the set of points of the airfoil that are equidistant from the two side faces of the airfoil (its pressure side and its suction side). For example, the point M shown is at the same distance d from the pressure side and from the suction side. The skeleton angle $\alpha$ at the point M is the angle between the tangent 124 to the neutral fiber at the point M and the axis A of the wheel. The skeleton angle $\alpha_0$ or upstream skeleton angle is the skeleton angle at the leading of the airfoil 120.

Figure 3A:
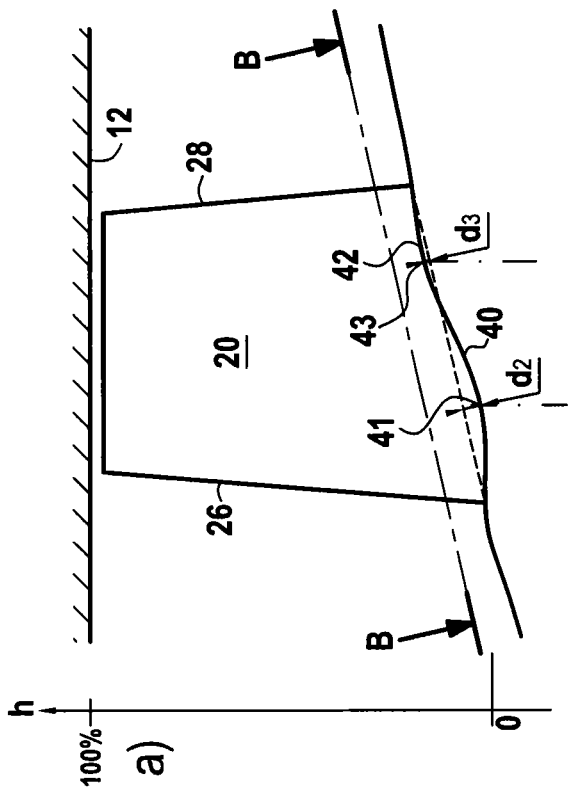
FIGS. 3A and 3B are figures showing an assembly comprising a platform associated with an airfoil and comprising:
 a) a diagrammatic view of the assembly as seen in the circumferential direction; and
 b) a graph showing the skeleton curve of the airfoil of said assembly;
where
Figure 3A:
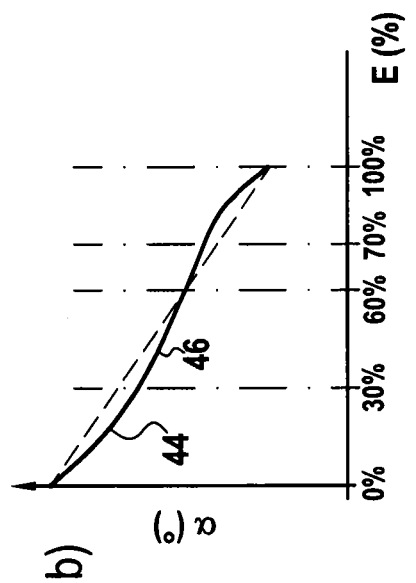
Figure 3B:
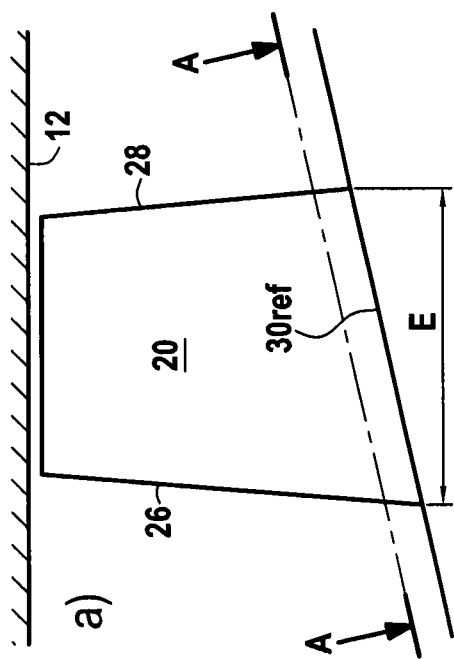
Figure 3B:
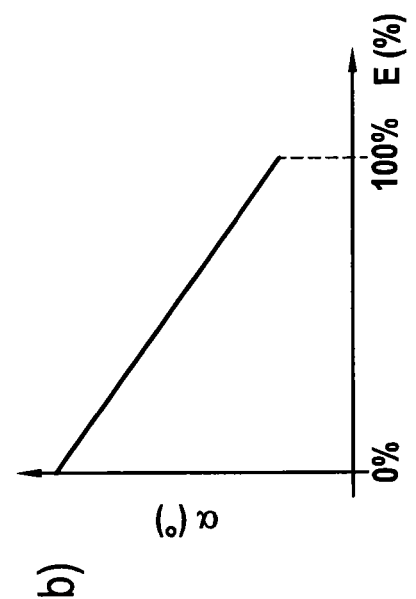

FIGS. 3A and 3B show respectively an assembly 1 (combining a platform 22 and an airfoil 20) in a prior art embodiment and in an embodiment of the invention.

FIG. 3A:

The platform surface 30 shown in FIG. 3Aa) has not been subjected to any specific alteration along the axis of the airfoil 20 (i.e. along the axis A). This platform surface is thus a reference platform surface $30_{ref}$ that is substantially conical.

In FIG. 3Ab), there is plotted the curve showing the variations in the skeleton angle of the FIG. 3Aa) airfoil in the plane A-A (the plane marked in chain-dotted lines in FIG. 3Aa)), as a function of axial position along the axis of the wheel 14. Axial position is marked in percentage as a function of position relative to the axial extent E of the airfoil 20. The axial extent E is the distance along the axis A between the leading edge 26 and the trailing edge 28 at the root of the airfoils 20 (FIG. 3Aa)). The airfoil 20 of the assembly shown in FIG. 3A is an airfoil of the type in which the skeleton curves and the linearized skeleton coincide, as shown in FIG. 3Ab).

FIG. 3B:

FIG. 3B shows an embodiment of the invention. In this embodiment, the platform surface 30 has been altered along the airfoil 20.

The alterations made are defined radially in relative manner relative to the reference platform surface $30_{ref}$. This surface $30_{ref}$ is defined as the substantially conical surface approximating the platform surface 30, this reference surface $30_{ref}$ being determined while ignoring both the circumferential depression and also any other localized alterations (if any and whether circumferential or otherwise) that might project from or be set back in the platform surface at various axial locations along the airfoils 20.

The surface alterations of the platform 30 and of the airfoils 20 are also defined axially relative to the axial extent E of the airfoils 20.

The platform surface 30 is altered to have a circumferential depression 40 (FIG. 3Ba)). The term depression (or conversely superconvergent or bulging surface) is used to mean a portion of the platform surface that lies radially inside (or respectively outside) the reference platform surface $30_{ref}$ and corresponds to the airflow passage locally being enlarged (or respectively reduced).

The circumferential depression 40 extends axially from the leading edges 26 of the airfoils 20 up to 60% of the axial extent E of the airfoils (along the axis A). In fact, the depression 40 extends nearly up to 60% of the axial extent E. The axial section 41 (perpendicular to the axis of the wheel 14) where this depression 40 is the deepest is situated axially in the range 15% to 35% of the axial extent E, and specifically at 30% of the axial extent E. In the sentence above, the "deepest" section means the section of the depression 40 where the distance $d_2$ relative to the reference platform surface $30_{ref}$ is the greatest (see FIG. 3Ba)).

Furthermore, the platform surface presents a circumferential bulging area 42, that may be referred to as "super-convergent", that is situated axially in the downstream half of the airfoil. The most projecting section 43 of this bulging area 42 is situated axially in the range 50% to 70% of the axial extent of the airfoil from the leading edge of the airfoil, and specifically at 70% of the axial extent E. In the sentence above, the "most projecting" section means the section of the circumferential area 42 for which the distance $d_3$ from the reference platform surface $30_{ref}$ is the greatest.

The above-described alterations 40 and 42 improve the efficiency of the bladed wheel 14. However they disturb the flow of fluid in the vicinity of the platform surface compared with the flow made possible by the theoretical platform surface $30_{ref}$. In the invention, in order to compensate for these disturbances, the shape of the airfoils 20 is modified in the manner shown in FIGS. 3Bb) and 4.

This modification affects (in general manner) mainly the radially inner half of an airfoil 20. This modification can be seen in particular in a section plane of the airfoil (plane V, FIG. 2) that is parallel to the platform surface and that is situated in the vicinity of the platform.

Figure 4:
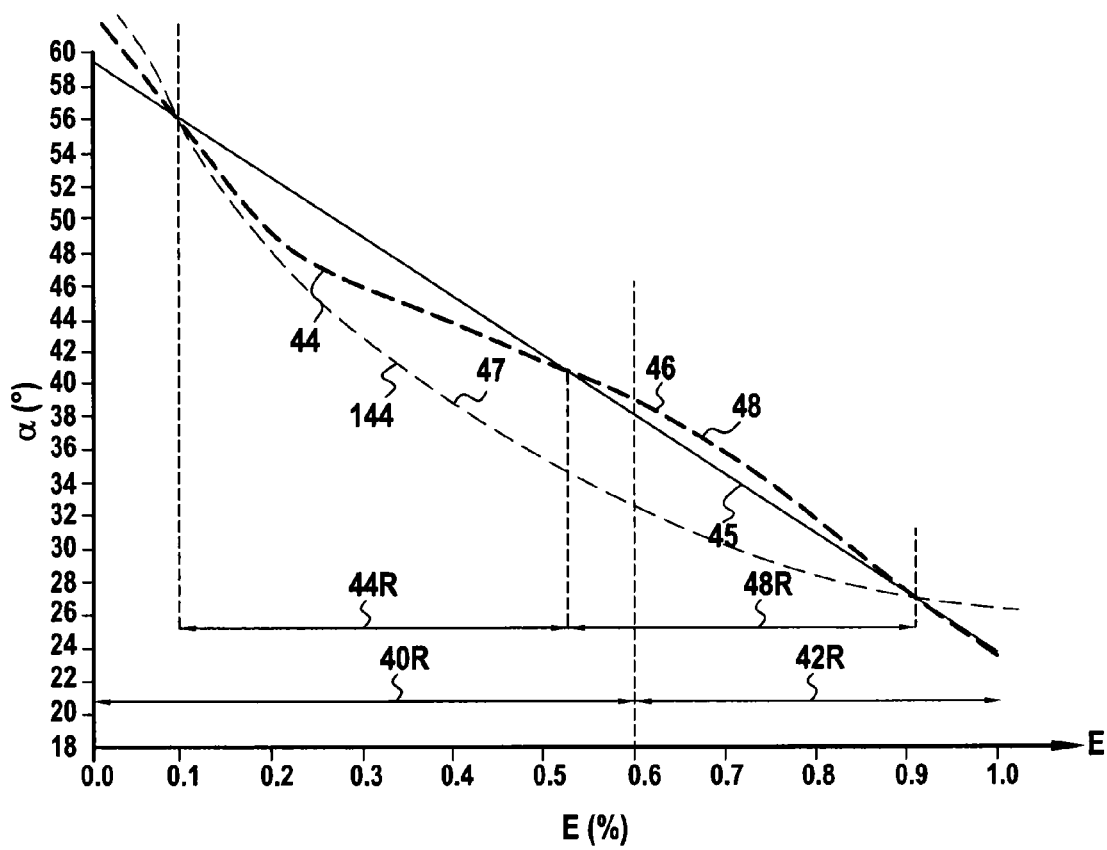
FIG. 4 is a graph showing two variants for the skeleton curve of an airfoil of an assembly of the invention, corresponding respectively to the first embodiment and to a second embodiment.

This modification is shown in FIG. 4 in which there can be seen:

- as a bold dashed line, the skeleton curve 46 representing variations in the skeleton angle α of the airfoil 20 for the first embodiment of the invention (FIG. 3B);
- as a fine dashed line, the skeleton curve 47 representing the variations in the skeleton angle α of an airfoil in a second embodiment of the invention; and
- as a continuous line, the linearized skeleton curve 45 of the airfoil 20, representing the variations in the linearized skeleton angle, which is the same for both embodiments.

In these various curves, the variations in the skeleton angle α are plotted as a function of axial position along the airfoil, this axial position being given as a percentage relative to the axial extent E of the airfoil 20.

In both embodiments, the shape of the platform surface is the same and is as shown in FIG. 3B.

The modification made in accordance to the invention to the airfoil 20 consists in the fact that the skeleton angle curve presents a lowered portion extending axially over less than half the axial extent of the circumferential depression 40. (The term "lowered portion" is used to mean a portion of a curve lying under the linearized skeleton angle curve: in other words, in the lowered portion, the skeleton angle is lower in absolute value than the linearized skeleton angle and is wider open.) This lowered portion is referenced 44 and 144 respectively for the first embodiment and for the second embodiment.

In the embodiments shown, the depression 40 extends over an area 40R occupying 0% to 60% of the axial extent E. In the invention, the curve 46 presents a lowered portion 44 extending axially over an area 44R covering at least 30% of the axial extent of the area 40R (from 0% to 60%) of the depression 40. Thus, in the first embodiment, the area 44R extends from 10% to 53% approximately of the axial extent E.

The area 44R may be included axially within the area 40R covered by depression 40, or it may extend beyond said area in a downstream direction. In an embodiment, the entire lowered portion 44 lies within the depression 40, and the area 44R is included within the area 40R. Conversely, in the second embodiment, the lowered portion 144 extends over nearly all of the axial extent of the airfoil, in particular it extends from 10% to 90% of the axial extent of the airfoil.

Furthermore, in addition to the lowered portion 44, the skeleton curve 46 shown in FIG. 4, which shows the shape of the airfoil 20 in the vicinity of the platform, also presents a raised portion 48. The term "raised portion" is used herein to mean a portion of the curve that lies above the linearized skeleton angle curve 45. This raised portion 48 is situated axially downstream from the lowered portion 44. In the example shown, the area 42R over which the bulging portion 42 extends lies in the range 60% to 100% of the axial extent E, and the area 48R over which the raised portion 48 extends lies in the range 53% to 90% of the axial extent E. Thus, the bulging area 42 and the raised portion 48 of the airfoil section are situated axially in substantially the same location.

In general, depending on the embodiment (see FIG. 4), the raised portion 48 may begin at its upstream end in the range 40% to 60% of the axial extent of the airfoil. At its downstream end it may continue substantially to about 90% of the axial extent E, at which point the curves 45, 46, and 47 cross, by construction. The presence of this raised portion 48 seeks to limit the possible effects on the offset to the flow profile that is induced by the lowered portion 44. The raised portion 48 preferably extends over at least 30% of the axial extent of the airfoil, and preferably over at least 40%.

In the second embodiment, and unlike the first, the skeleton curve 47 does not have a raised portion downstream from the lowered portion. On the contrary, the skeleton curve remains under the linearized skeleton curve, with a lowered portion 144 occupying nearly all of the axial extent of the airfoil (in the range 10% to 90%). It follows that the skeleton curve 47 presents a slope of smaller absolute value than does the linearized skeleton curve in the range 80% to 100%, and even in this embodiment in the range 60% to 100% of the axial extent E of the airfoil from its leading edge.

Figure 6:
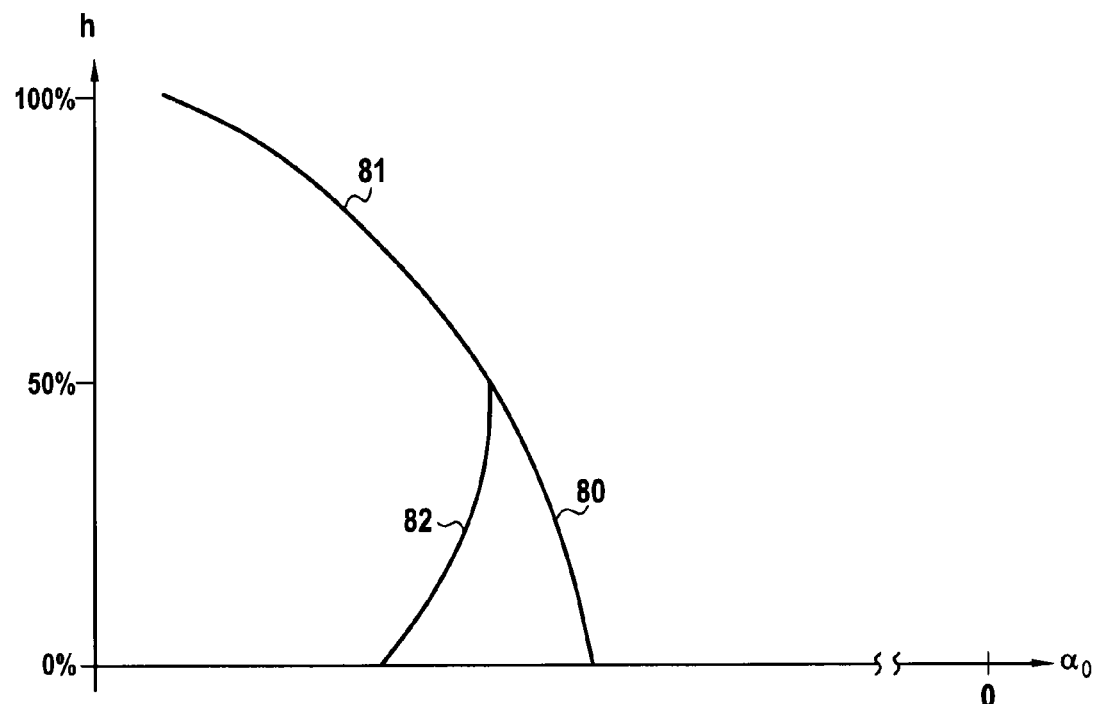
FIG. 6 is a graph plotting the curve showing variations in the skeleton angle upstream from an airfoil in an embodiment of the invention.

FIG. 6 shows a potential additional alteration of the airfoil suitable for compensating the undesirable effects caused by the alterations to the surface of the platform 30. FIG. 6 shows variations in the upstream skeleton angle $\alpha_0$ of an airfoil as a function of the height h expressed as a percentage of the total height of the airfoil and as measured from the root of the airfoil to the end of the airfoil.

In this embodiment, in a radially lower half of the airfoil, the upstream skeleton angle $\alpha_0$ (FIG. 5) differs from the upstream skeleton angles used in normal manner. In the lower half of the airfoil, the variations in the skeleton angle are represented by the curve 80 for a typical upstream skeleton angle as used in known manner, and by the curve 82 for the upstream skeleton angle in an embodiment of the invention. In the upper half of the blade, these two curves coincide to form a curve 81.

In conventional manner, the airfoils are arranged in such a manner that the upstream skeleton angle decreases in absolute value from the tip of the airfoil (h=100%, h being the radial distance from the root of the airfoil) to the root of the airfoil (h=0%). Conversely, in this improvement of the invention, in the lower fourth of the airfoil and possibly up to 40% of the height of the airfoil extending from the root of the airfoil, the absolute value of the upstream skeleton angle increases (i.e. the skeleton angle becomes more closed) on approaching the root of the airfoil. This modification seeks to compensate the localized increase in flow rate at the root of the airfoil caused by the contouring of the passage. It also serves to protect the blade from any loss of surge margin.

The invention is particularly suitable for blades that are to operate in a subsonic flow.

The invention claimed is:

1. An assembly comprising:
   an airfoil for a turbine engine bladed wheel and a platform on which the airfoil is configured to be mounted;
   a plurality of the airfoils configured to be fastened to the platform or to a plurality of the platforms assembled together so as to form a bladed wheel including a wheel axis and defining upstream and downstream directions along that axis, the airfoils being arranged radially in the wheel;
   in the wheel, the platform or the assembled-together platforms present a platform surface between the airfoils and that radially defines an inside of gas-passing passages formed between the airfoils;
   the platform surface presenting a circumferential depression extending axially substantially between a leading edge of an airfoil at its upstream end and up to no more than 60% of an axial extent of the airfoil at its downstream end;
   wherein:
   a skeleton curve is a curve representing variations of a skeleton angle of the airfoil in a section plane substantially parallel to the platform surface as a function of position along the axis of the wheel,
   a linearized skeleton curve is a curve representing variations of an angle as a function of position along the axis of the wheel that connects together in a straight line points representing the skeleton angle respectively at 10% and at 90% of the axial extent of the airfoil from the leading edge,
   in a vicinity of the platform, a lowered portion of the skeleton curve which lies under the linearized skeleton curve extends axially over at least half of the axial extent of the depression.

2. An assembly according to claim 1, wherein the circumferential depression extends axially substantially between the leading edge at its upstream end and only 40% of the axial extent of the airfoil at its downstream end.

3. An assembly according to claim 1, wherein a deepest section of the depression is situated axially in a range of 15% to 35% of the axial extent of the airfoil from the leading edge of the airfoil.

4. An assembly according to claim 1, wherein the platform surface presents a circumferential bulging area situated axially in a downstream half of the airfoil.

5. An assembly according to claim 4, wherein a most projecting section of the bulging area is situated axially in a range of 50% to 70% of axial extent of the airfoil from the leading edge of the airfoil.

6. An assembly according to claim 1, wherein, in the vicinity, the skeleton curve presents a raised portion lying above the linearized skeleton angle curve and situated axially downstream from the lowered portion.

7. An assembly according to claim 6, wherein the raised portion is located axially substantially at the level of a circumferential bulging area of the platform surface, the circumferential bulging area being situated axially in a downstream half of the airfoil.

8. An assembly according to claim 1, wherein the skeleton curve presents a slope of absolute value that is less than that of the linearized skeleton curve in a range of 80% to 100%, or in a range of 60% to 100%, of the axial extent of the airfoil from its leading edge.

9. An assembly according to claim 1, wherein an upstream skeleton angle is the skeleton angle at the leading edge of the airfoil; in a radially lower fourth of the airfoil, the upstream skeleton angle increases in absolute value on approaching the airfoil root.

10. A turbine engine blade comprising an assembly according to claim 1 and a platform formed integrally with at least one airfoil.

11. A turbine engine bladed wheel comprising blades according to claim 10.

12. A turbine engine bladed wheel comprising at least one assembly according to claim 1.

13. A turbine engine comprising at least one bladed wheel according to claim 11.

14. A turbine engine comprising at least one bladed wheel according to claim 12.

* * * * *